No. 688,718.  
Patented Dec. 10, 1901.  
G. F. CONNER.  
DRIVE BELT FOR VARIABLE SPEED GEARING.  
(Application filed Mar. 11, 1901.)

(No Model.)

Inventor  
George F. Conner

Witnesses  
By  
Attorneys

THE NORRIS PETERS CO., PHOTO-LITHO., WASHINGTON, D. C.

UNITED STATES PATENT OFFICE.

GEORGE F. CONNER, OF PORT HURON, MICHIGAN.

DRIVE-BELT FOR VARIABLE-SPEED GEARING.

SPECIFICATION forming part of Letters Patent No. 688,718, dated December 10, 1901.

Application filed March 11, 1901. Serial No. 50,692. (No model.)

*To all whom it may concern:*

Be it known that I, GEORGE F. CONNER, a citizen of the United States, residing at Port Huron, in the county of St. Clair and State of Michigan, have invented certain new and useful Improvements in Drive-Belts for Variable-Speed Gearing; and I do declare the following to be a full, clear, and exact description of the invention, such as will enable others skilled in the art to which it appertains to make and use the same.

This invention relates to the construction of driving-belts for variable-speed gearing of that type employing cone-pulleys; and it has for its object to increase the efficiency and durability of such belts and to provide a belt having maximum strength and driving power.

To this end the invention consists in a drive-belt embodying certain novel features of construction and combination of parts, as will be hereinafter more fully described, and particularly pointed out in the appended claims.

Figure 1:
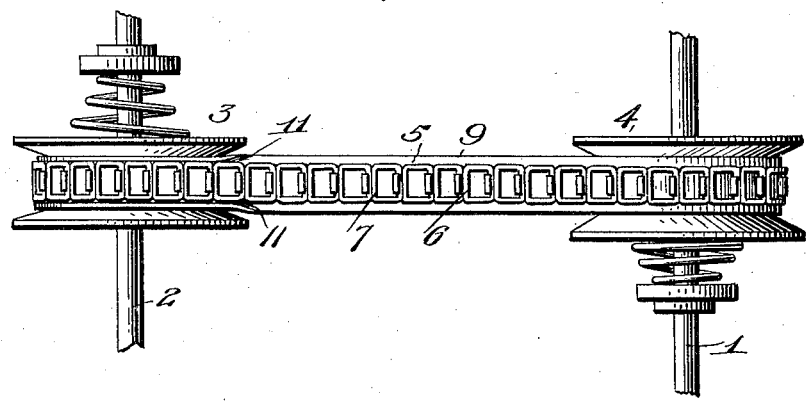
Figure 2:
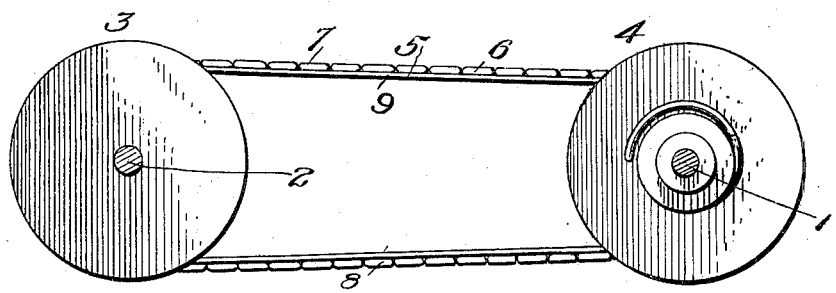
Figure 3:
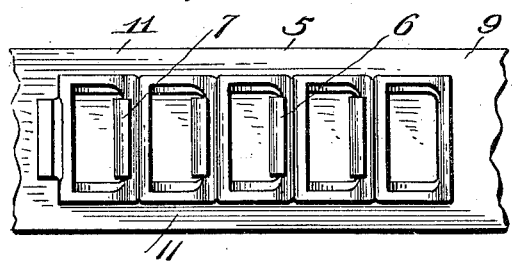

In the accompanying drawings, Figure 1 is a top plan view showing the application of the belt to a pair of cone-pulleys. Fig. 2 is a side elevation of the same. Fig. 3 is a detail plan view of a portion of the belt on an enlarged scale, and Fig. 4 is a cross-sectional view through the belt and a cone-pulley.

Referring now more particularly to the drawings, the numeral 1 represents a drive-shaft, and the numeral 2 a driven shaft provided with cone-pulleys 3 and 4, each composed of a pair of disks having conical driving-surfaces arranged to face each other. One disk of each pair of disks is keyed or otherwise fixed to its shaft, while the other disk is mounted to slide thereon and is adapted to be moved toward and from said fixed disk. If desired, however, the cone-disks of each pulley may both be mounted to slide upon the shaft, and in practice suitable mechanism, not necessary to be herein shown, is employed to move the disks of one pair toward each other and to simultaneously move the disks of the other pair away from each other to control or regulate the relative speeds of rotation of the two shafts by simultaneously increasing the belt-running surface of the pulley upon one shaft and decreasing such surface of the pulley on the other shaft in the usual manner. The form of shifting mechanism employed for this purpose is immaterial; but I prefer that shown in my application for patent for reversible variable-speed gearing filed of even date herewith and designated by Serial No. 50,691. The drive-belt 5 connects the pulleys 3 and 4, and in accordance with my invention is composed of a link chain 6, formed of jointed link members 7, each of which is provided with flattened angular side bearing-faces 8. To this chain is secured a belt or band 9, of leather or other fabric, which belt is arranged upon the under side of the chain, so as to form the driving-surface, and is fastened to the chain in any approved manner, but preferably by providing the links of the chain with integral projections 10, which extend through openings formed in the belt and are bent or clenched down against the under surface of the belt to firmly secure the same to the chain. The belt or band 9 is made somewhat wider than the chain, so that the longitudinal side edges 11 thereof are adapted to fold out under pressure at an angle to the body of the belt and against the flattened angular side bearing-faces 8 of the chain-links to form angular side bearing-surfaces which contact with the conical driving-surfaces of the pulley-sections.

Figure 4:
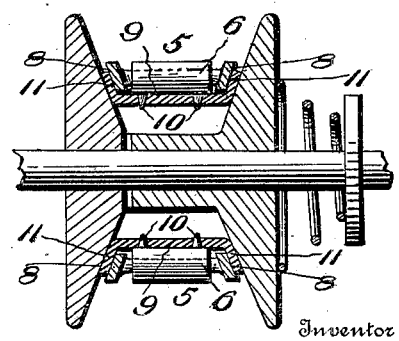

As shown in Fig. 4, when the cone-disk sections of the pulleys are moved toward and from each other a varying pressure is set up against the said side edges 11 of the belt or band 9, which are thereby caused to fold outwardly at an angle against the angular side faces 8 of the chain-links at a greater or less angle to the body of the belt, according to the amount of pressure exerted thereon by said disks, and the pressure increases proportionately as the disks are moved toward each other. From this it will be clearly understood that a close frictional contact between the side edges 11 of the belt, which constitutes the driving-surface thereof, and the conical driving-surface of the pulley-disks will be maintained at all times, but that the pressure will be varied according to the position of said disks relatively to each other, so that the driving power of the belt is increased or diminished, accordingly as the pulley-disks are adjusted for high or low speed. By providing a drive-belt consisting of a link chain secured upon the exterior surface of a band or belt of pliable material the strength and durability of the latter are not only increased to a great extent, but the edges of the belt in folding outwardly against a rigid angular surface are adapted to maintain a much closer frictional engagement with the cone driving-faces of the pulley-disks than could otherwise be secured, whereby maximum driving power is afforded. The side edges of the belt, it will be clearly seen, constitute frictional driving-surfaces of pliable material having a rigid metallic backing formed by the angular flattened side faces 8 of the link members 7 of the chain.

From the foregoing description, taken in connection with the accompanying drawings, the construction, mode of operation, and advantages of the invention will be readily understood without a further extended description.

Changes in the form, proportion, and minor details of construction may be made within the scope of the invention without departing from the spirit or sacrificing any of the advantages thereof.

Having thus fully described my invention, what I claim as new, and desire to secure by Letters Patent, is—

1. A drive-belt consisting of a link chain having inclined side faces, and laterally-projecting flexible driving members adapted to fold against said inclined faces, substantially as described.

2. A drive-belt consisting of a link chain, the links of which are formed with side bearing-faces and faced with a continuous base of pliable material, said base having longitudinal free edges projecting laterally a short distance beyond the chain and forming yielding frictional drive-surfaces adapted to fold against said side bearing-faces, substantially as described.

3. A driving-belt consisting of jointed metallic links and a band of a pliable material secured thereto and of a width greater than the links, said links having angular side faces against which the edges of the band are adapted to fold, substantially as described.

4. A driving-belt consisting of jointed metallic links and a band of a pliable material secured thereto and of a width greater than the links, said links being formed with angular side faces against which the free edges of the band are adapted to fold, and having integral studs passed through the band and clenched, whereby the band and links are united, substantially as set forth.

In testimony whereof I have hereunto set my hand in presence of two subscribing witnesses.

GEORGE F. CONNER.

Witnesses:
H. B. HOYT,
G. R. HAIGH.